Dec. 23, 1958 A. M. SKELLETT 2,866,126

DIRECT VIEW TELEVISION REPRODUCING TUBE OR THE LIKE

Filed May 3, 1956

INVENTOR
ALBERT M. SKELLETT
BY
Eyre, Mann & Burrows
ATTORNEYS

United States Patent Office 2,866,126

Patented Dec. 23, 1958

2,866,126

DIRECT VIEW TELEVISION REPRODUCING TUBE OR THE LIKE

Albert M. Skellett, Madison, N. J., assignor to Tung-Sol Electric Inc., a corporation of Delaware Application May 3, 1956, Serial No. 582,571

10 Claims. (Cl. 315—13)

The present invention relates to television receiving and reproducing systems and comprises a novel direct view reproducing tube, either for black and white or color reproduction, provided with a novel electron gun assembly that permits reproduction of a picture image of relatively great width, for example, an image of the relative proportions now employed in the so-called "3D" pictures of the motion picture industry.

The face of the new tube, unlike the conventional television picture tubes, is concave to the viewer. Due to the novel electron gun assembly incorporating horizontal scanning means, the tube need not be longer than conventional tubes of the same picture height but of the standard 4 x 3 aspect ratio. In the new tube, the electron source extends across the full width of the tube, a distance equal to the width of the picture to be formed, the issuing sheet of electrons are accelerated and focused by cylindrical electronic lenses and electrostatic means are provided for synchronously varying the orientation of the focused sheet of electrons with respect to a horizontal slot to thereby effect horizontal scanning. For black and white reception and reproduction, the tube contains but a single gun assembly. For color reception and reproduction, three like gun assemblies are provided.

For a better understanding of the invention and of specific embodiments thereof, reference may be had to the accompanying drawing of which:

Figures 1, 2, 3:
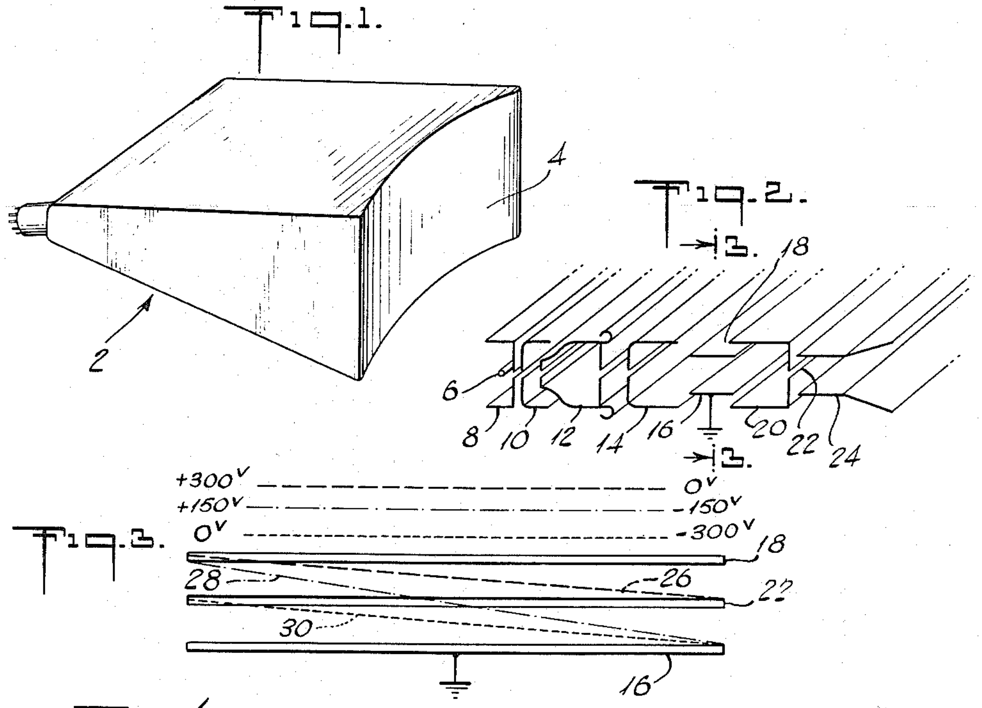
Fig. 1 is a diagrammatic isometric view of a television reproducing tube embodying the invention.
Fig. 2 is a diagrammatic view of an electron gun assembly suitable for use in the tube of Fig. 1.
Fig. 3 is a diagram explanatory of the operation of the horizontal scanning means of the gun assembly of Fig. 2.

The general shape of the new tube of the invention is shown in Fig. 1, the tube being indicated by the reference numeral 2 and the face plate thereof by the reference numeral 4. It will be noted that the tube 2 has a uniform width from back to front and tapers gradually in height from the concave face plate 4 to the rear of the tube. The aspect ratio of the face plate 4 is preferably that of the so-called "3D" films now in wide use in the motion picture industry.

In Fig. 2 the electrode assembly of a single gun of a tube such as that of Fig. 2 is diagrammatically shown as comprising a cathode 6, a first grid 8, a second grid 10, third and fourth grids 12 and 14, respectively, horizontal deflecting plates 16 and 18 of which the former is grounded and the latter of a special construction to be described hereinafter, a grid 20, having a masking slot 22, and vertical deflecting plates 24, 24. Each of the electrodes of Fig. 2 extend the full width of the television picture tube. The cathode 6 may be a filamentary cathode or an indirectly heated cathode of conventional construction except for its length. Electron lenses provided by the apertures between grids 8 and 10 and between grids 12 and 14 focus the electron beam into a thin horizontal sheet. The deflector plates 16 and 18 bend the ribbon like beam of electrons to cause all of the beam to be trapped within the grid 20 except such small part as intersects the slot 22. By means hereinafter to be described the point of intersection of the ribbon like beam of electrons with the slot 22 is made to move back and forth along the slot for horizontal scanning of the screen. The small, substantially circular, beam of electrons which passes through the masking slot 22 is deflected vertically by the plates 24 to provide the vertical component of scan.

The horizontal movement along the masking slot 22 of the point of intersection with the ribbon like electron beam will be understood by reference to the diagram of Fig. 3 which corresponds roughly to a transverse section on the line 3—3 of Fig. 2. In Fig. 3 only the plates 16 and 18 and the slot 22 are diagrammatically indicated. The dashed line 26 represents the position of the electron ribbon like beam when the voltage on plate 18 is zero at the right hand side and highly positive, say +300 volts, at the left hand side. Under these conditions of voltage, assuming a linear variation of voltage from the low to the high voltage side of the plate, the extreme right hand side of the electron ribbon 26 will intersect the slot 22 because the potential of this side of the plate 18 is the same potential, namely, ground, as the plate 16. At every other point along the width of the plate 18 the electron beam will be shifted toward the plate 18 and will miss the aperture 22. The dot-dash line 28 represents a cross section of the ribbon like electron beam at a time when the central portion of the plate 18 is at ground potential, the right hand side is negative with respect to ground, say −150 volts, and the left hand side is positive with respect to ground, say +150 volts. Under these conditions the intersection of the beam with the slot 22 is substantially at the center of the slot. The line 30 of small dashes, represents a cross section of the ribbon like beam at a time when the left hand side of the plate 18 is at zero or ground potential and the right hand side is negative with respect to ground, say −300 volts. The intersection of the beam 30 with the slot is then at the left hand end of the slot. Thus by suitably varying the potential distribution on the plate 18 the intersection of the beam with the slot may be made to scan the slot to provide the horizontal scanning component of the gun assembly.

Figure 4:
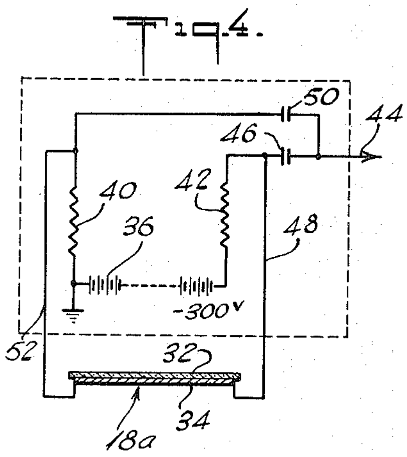
Fig. 4 is a diagram of an electrode structure and circuit therefor illustrating one arrangement for producing horizontal scanning in accordance with the invention.
Figure 5:
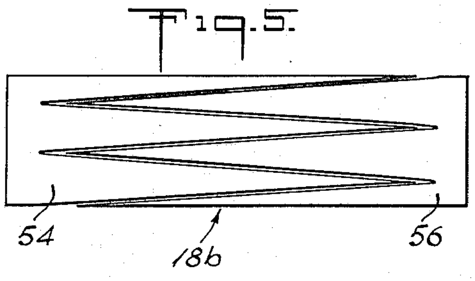
Fig. 5 is a plan view of an alternative electrode structure suitable for producing horizontal scanning in accordance with the invention.

Figs. 4 and 5 show alternative arrangements for providing the controlling potentials on the plate 18. In Fig. 4 the plate 18*a*, corresponding to the plate 18 of Figs. 2 and 3, is shown as comprising a ceramic sheet 32 having a resistive coating 34 thereon. Connected to the coating at opposite sides of the plate is a circuit including a direct current source 36 of voltage, the high potential end of which is grounded and connected through a resistor 40 to the resistive coating 34. The low potential end of the source 36 is connected through a second resistor 42 to the resistive coating 34 at the other side of the plate. Alternating voltage of the horizontal scanning frequency and from any suitable source (not shown) is impressed on a terminal 44 connected through a capacitor 46 to the junction of resistor 42 and lead 48 connecting to the resistive coating 34, and through a capacitor 50 to the junction between resistor 40 and lead 52 connected to the coating 34 at the other side of the plate. The source 36 may be for example, 300 volts. It will be apparent that the above circuit will apply 300 volts peak scanning potential to both ends of the resistive deflector, and the potentials all along the width of the deflector strip will vary in a linear fashion.

An alternative arrangement whereby the desired scanning potentials may be applied to the upper plate 18 of Fig. 2 is shown in Fig. 5. In this arrangement the plate 18b, corresponding to plate 18 of Figs. 2 and 3, is made of two inter-leaving comb electrodes 54 and 56 of conducting material. With potentials such as were described as applied across the width of the resistive plate 18a, applied to the electrodes 54 and 56 the potential distribution, because of the interleaving of the comb shaped electrodes, will be the equivalent of that in the resistive electrode. Other arrangements for obtaining the desired potential distribution will occur to those skilled in the art. For example, although for purposes of illustration, one of the plates of the pair 16, 18 has been shown as grounded and the other as providing the linear potential distribution, it is obvious that the desired potential distribution could be provided by application of varying potentials, as by a push-pull circuit, to both plates of the pair.

Figure 6:
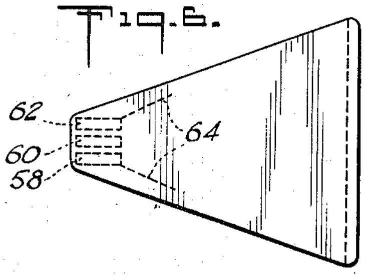
Fig. 6 is a diagrammatic side view of a color television reproducing tube embodying the invention.

For black and white reproduction a single gun assembly of the above described type is employed. For color reproduction three similar electrode assemblies are used except that a single pair of vertical deflecting electrodes are sufficient for cooperation with the three color guns. Fig. 6 shows a side view of a color television tube embodying the invention wherein the three color gun assemblies are indicated by the reference numerals 58, 60 and 62 with a single pair of vertical deflecting electrodes 64.

The invention has now been described with reference to the broad principle thereof and alternative arrangements have been shown for providing the potential distribution for horizontal deflection. No attempt has been made to illustrate or describe parts of the new tube which will be of conventional construction. For example, in the color television reproducing tube the usual mask, either with circular apertures or of wire mesh form, will be employed. The phosphor mosaic scanned through the mask will be formed by the conventional photographic process. Conventional converging means for the three beams issuing from the guns 58, 60 and 62 and conventional vertical deflecting means will be employed. Because of the horizontal scanning effected by the plates 16 and 18, static and dynamic convergence of the electron beam issuing from the masking slot become one-dimensional problems and are therefore simpler to accomplish than in conventional color television tube.

The following is claimed:

1. In a direct view television reproducing tube, means for creating a ribbon like sheet of electrons of a width equal to the width of the picture to be reproduced, a member provided with a masking slot of a length at least equal to the width of the created electron sheet and positioned for passage therethrough of undeflected electrons of the created electron sheet, horizontal scanning alternating electrostatic means for so deflecting electrons of said sheet that electrons only pass through the slot at a location which traverses the slot in synchronism with the alternations of said electrostatic means, and means responsive to frame frequency for vertically deflecting the beam of electrons beyond the slot.

2. In a television reproducing tube according to claim 1 wherein said electrostatic means comprise two plate elements each parallel to said slot and positioned for passage of the sheet of electrons therebetween, said plate elements being so constructed that when horizontal scanning alternating potentials are applied thereacross the location across the width of the electron sheet where the electrostatic fields due to the potentials on said plate elements act equally on the electrons will shift linearly back and forth across the width of the sheet of electrons and thereby vary correspondingly the location along the slot where electrons pass through.

3. In a television tube according to claim 2 wherein one of said plate elements is a grounded metal sheet and the other plate element is a sheet of insulating material having a uniform coating of electrically resistive material thereon.

4. In a television tube according to claim 2 wherein one of said plate elements is a grounded metal sheet and the other plate element is composed of two interleaving comb shaped parts designed to create a substantially linear electrostatic field when at different potentials.

5. A direct view television reproducing tube having an elongated cathode adapted to emit electrons over a length parallel to and at least equal to, one dimension of a rectangular image to be formed, means for accelerating and focusing electrons emitted by the cathode into a ribbon like sheet of a width equal to said one dimension, an element having a masking slot of a length equal to said one dimension of the image to be formed and positioned to permit passage therethrough of undeflected electrons of the focused sheet, and electrostatic means for so deflecting electrons of the sheet like beam as to cause the sheet like beam to intersect the slot at a location that moves back and forth along the slot and thereby provides the sole scanning component in the direction of said dimension.

6. The television tube according to claim 5 wherein said electrostatic means comprise two plate elements each parallel to said slot positioned between the accelerating and focusing means and the slot for passage of the electron sheet therebetween, one of said plate elements being so constructed that when alternating potentials are applied thereacross and the other plate element maintained at a fixed potential within the range of the alternating potentials the location across the width of the sheet where the electrostatic fields due to the potentials on said plate elements act equally on the electrons of the sheet will shift linearly back and forth across the sheet of electrons to vary correspondingly the location along the slot where electrons pass through.

7. The television tube according to claim 6 wherein one of said plate elements is a grounded metal sheet and the other plate element is a sheet of insulating material having a uniform coating of electrically resistive material thereon.

8. The television tube according to claim 6 wherein one of said plate elements is a grounded metal sheet and the other plate element is composed of two interleaving comb shaped parts designed to create a substantially linear electrostatic field when at different potentials.

9. A direct view color television reproducing tube having a face plate with an aspect ratio greater than 4 by 3, said tube being of uniform width from the rear of the tube to the sides of the face plate and containing three color gun assemblies, each assembly comprising a horizontally disposed cathode adapted to emit electrons over a length equal to the width of the picture to be formed, cylindrical electron lenses positioned to accelerate and focus electrons emitted by the cathode into a ribbon like sheet of the width of the picture to be formed, an element having a masking slot in the path of the focused sheet of electrons, and electrostatic deflecting means for varying the orientation of the focused electron sheet with respect to the slot to cause the sheet of electrons to intersect the slot at one location only, said electrostatic means causing the location of intersection of the electron sheet with the slot to move back and forth along the slot and thereby provide, in effect, the horizontal scanning component of the beam of electrons and vertical deflecting means for the electron beams emerging from said guns.

10. The television tube according to claim 9 wherein the face plate thereof is concave toward the exterior about a vertical axis of curvature to provide a three dimensional effect to the viewer of a picture image thereon.

References Cited in the file of this patent

UNITED STATES PATENTS

| | | |
|---|---|---|
| 2,214,574 | Bruck | Sept. 10, 1940 |
| 2,361,998 | Fleming-Williams | Nov. 7, 1944 |
| 2,372,328 | Labin | Mar. 27, 1945 |
| 2,449,558 | Lanier | Sept. 21, 1948 |
| 2,513,742 | Pinciroli | July 4, 1950 |
| 2,704,336 | Kazan | Mar. 15, 1955 |